United States Patent
Itoh et al.

[15] 3,670,282
[45] June 13, 1972

[54] CURRENT LIMITING DEVICE

[72] Inventors: Toshio Itoh; Toshio Miyamoto; Yuichi Wada, all of Amagasaki, Japan

[73] Assignee: Mitsubishi Denki Kabushiki Kaisha, Tokyo, Japan

[22] Filed: Aug. 6, 1969

[21] Appl. No.: 847,924

[30] Foreign Application Priority Data

Aug. 7, 1968 Japan..................................43/55958

[52] U.S. Cl..................................337/21, 337/159, 337/290
[51] Int. Cl..................................H01h 85/06
[58] Field of Search..................337/21, 114, 119, 151, 152, 337/158, 159, 290, 315, 326, 331, 401, 402, 403, 404, 405, 407, 409

[56] References Cited

UNITED STATES PATENTS

| | | | |
|---|---|---|---|
| 3,501,730 | 3/1970 | Ito et al. | 337/159 |
| 3,281,559 | 10/1966 | Ebensteiner | 337/403 |
| 2,505,193 | 4/1950 | Loporto | 337/119 |
| 2,087,905 | 7/1937 | French | 337/119 |

Primary Examiner—Bernard A. Gilheany
Assistant Examiner—Dewitt M. Morgan
Attorney—Robert E. Burns and Emmanuel J. Lobato

[57] ABSTRACT

A unitary structure of two opposite electrodes insulated from each other by a solid insulation is connected to a housing including cylinder and piston means. A current limiting material with self-restoration centrally extends through the structure except for the external portion of the outer electrode and contacts the piston. To prevent the material vaporized upon a flow of overcurrent from externally leaking O-rings or a metallic gasket can be disposed between the structure and housing. Alternatively the housing may be jointed to the structure through metal-to-metal or metal-to-insulation contact under pressure, shrink fit, welding or brazing.

9 Claims, 5 Drawing Figures

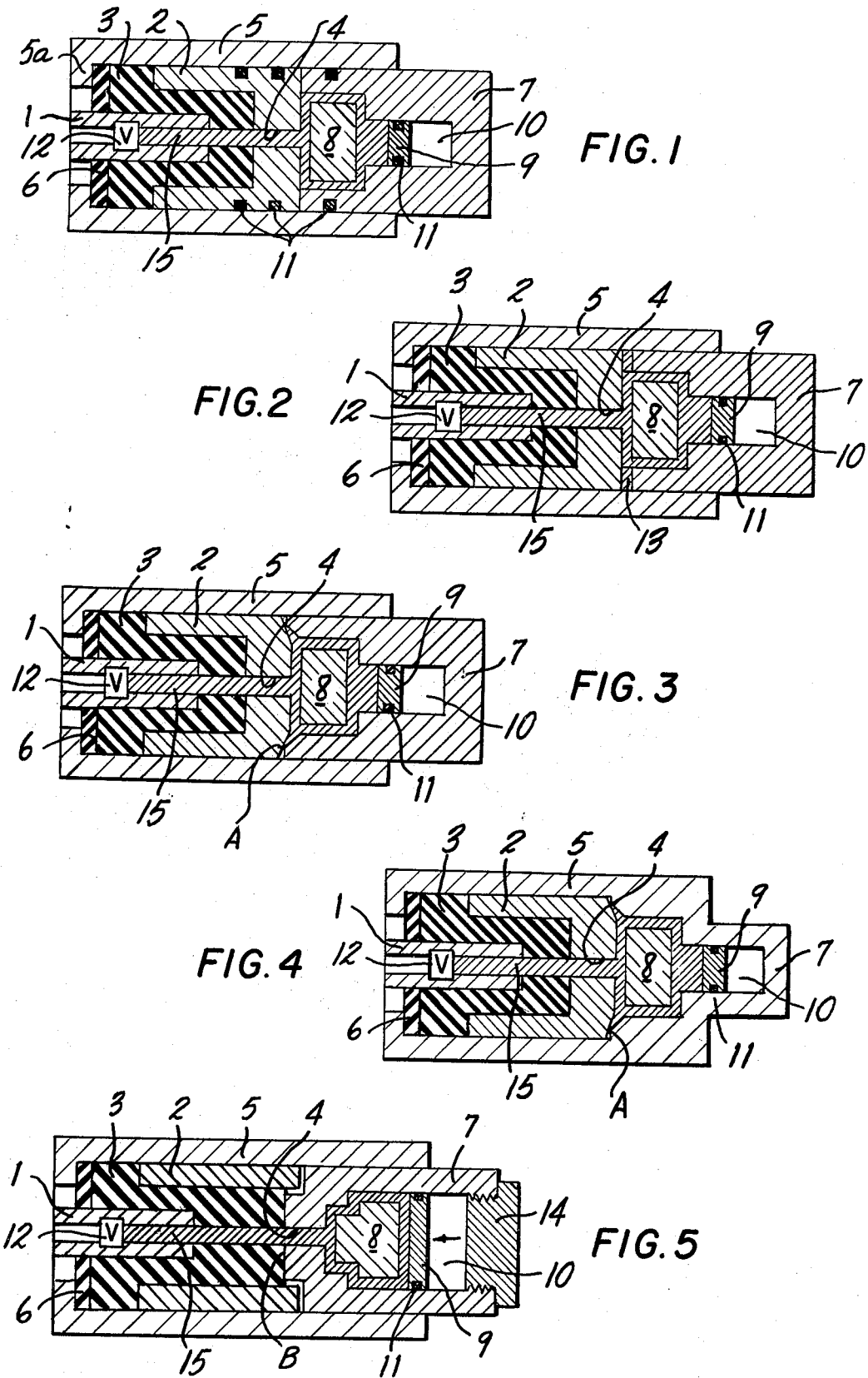

CURRENT LIMITING DEVICE

CROSS REFERENCE TO RELATED APPLICATIONS

Reference is made to the following copending applications:

U.S. application, Ser. No. 708,048 entitled Current Limiting Equipment, filed by Toshio Ito, Toshio Miyamoto, Yutaka Murai and Yuichi Wada on Feb. 26, 1968 now U.S. Pat. No. 3,501,730 and assigned to the same assignee as the present application.

U.S. application, Ser. No. 708,406 entitled Current Limiting Circuit, filed by Toshio Ito, Toshio Miyamoto, Yutaka Murai and Yuichi Wada on Feb. 26, 1968, and assigned to the same assignee as the present application.

U.S. application, Ser. No. 708,653 entitled Current Limiting Device, filed by Toshio Ito, Toshio Miyamoto and Yuichi Wada now U.S. Pat. No. 3,488,761 and assigned to the same assignee as the present application.

BACKGROUND OF THE INVENTION

This invention relates to improvements in a current limiting device of the type using a current limiting material having the self-restoring property.

There have been previously proposed various current limiting device of the type referred to. For example, the above cited copending U.S. application, Ser. No. 708,048 describes and claims a current limiting equipment including pressure buffer means for preventing a pressure within the device from excessively rising upon vaporizing a current limiting material involved due to a flow of overcurrent therethrough. The above cited copending U.S. application, Ser. No. 708,406 discloses and claims a current limiting circuit comprising a current limiting device of the type referred to and an ordinary switch connected in parallel circuit relationship to the current limiting device and permitting a flow of nominal stationary current therethrough in order to allow a high current to readily flow through the circuit in response to an increase in capability of the associated circuitry and also to select, at will, a time point at which the current limiting operation is started by controlling a time point at which the parallel switch is brought into its open position, and if desired, in order to effect selective interruption for current limiting purpose. Further the above cited copending U.S. application, Ser. No. 708,653 describes and claims a current limiting device including a housing filled with a current limiting material and having at least one portion formed at an electrically resisting material disposed in parallel circuit relationship with the current limiting material for the purpose of suppressing any extraordinary voltage that may be developed across the device during the current limiting operation.

With all the measure as above described, a flow of overcurrent through the particular current limiting material causes the material to vaporize to bring the associated device into the interrupting state. After a predetermined interval of time the vaporized material is cooled to be liquidized or solidified as the case may be to restore the device to the original conductive state. The vaporization of the current limiting material also causes the generation of a very high pressure in that space occupied by the material which pressure, in turn, puts the vaporized material in the form of a plasma. It is highly desirable to prevent that plasmatic material from externally leaking from the space therefor.

SUMMARY OF THE INVENTION

Accordingly it is an object of the invention to provide a current limiting device including a current limiting material having the self-resotring property and responsive to a flow of overcurrent therethrough to vaporize to provide a plasmatic material under a very high pressure wherein improved means are provided for preventing the plasmatic material from leaking externally thereof due to the high pressure.

The invention accomplishes this object by the provision of a current limiting device comprising, in combination, a first electrode and a second electrode disposed in spaced opposite relationship and having respectively a pair of central holes extending in axially aligned relationship therethrough, a solid body of electrically insulating material for electrically insulating the first electrode from the second electrode and having a hole extending therethrough and aligned and communicating with the central holes in the first and second electrodes, a housing rigidly secured to the second electrode to form therein a hermetically sealed space with the latter the hermetically sealed space communicating with all the holes, an amount of current limiting material filling both the holes and the hermetically sealed space, and responsive to a flow of overcurrent therethrough to vaporize, and means for preventing the current limiting material from externally leaking through a clearance between the second electrode and the housing upon vaporizing the material.

BRIEF DESCRIPTION OF THE DRAWING

The invention will become more readily apparent from the following detailed description taken in conjunction with the accompanying drawing in which:

FIG. 1 is a longitudinal sectional view of a current limiting device constructed in accordance with the principles of the invention; and FIGS. 2 through 5 are views similar to FIG. 1 but illustrating different modifications of the invention.

Throughout the FIGS. like reference numerals designate the corresponding or similar components.

DESCRIPTION OF THE PREFERRED EMBODIMENTS

Referring now to the drawing and FIG. 1 in particular, it is seen that an arrangement disclosed herein comprises a first metallic electrode 1 in the form of a rod and a second electrode 2 in the form of a cup disposed in spaced opposite relationship and axially aligned with other with the first electrode partly extending into the "cup" through the open mouth thereof. A solid body 3 of any suitable electrically insulating material is interposed between the first and second electrode 1 and 2 respectively to connect them together in electrically insulated relationship. The first electrode 1, the insulating solid body 3 and the second electrode 2 axially aligned with one another have a single central hole 4 axially extending therethrough and are fixedly fitted into a tubular metallic envelope 5 having an internally directed flange 5a at one end and fully open at the other end. The flange 5a serves to support the first electrode 1 to the envelope 5 by having an electrically insulating annulus 6 closely fitted onto the first electrode 1 and sandwiched between the inner face of the flange 5a and the exposed surface of the insulating solid body 3. Therefore it will be appreciated that the first electrode 1 is electrically insulated from the metallic envelope 5 by the insulating solid body and annulus 3 and 6 respectively.

The envelope 5 is closed at the other end by a metallic block or housing 7 rigidly fitted into the other end portion thereof and provided therein with a stepped opening communicating in axially aligned relationship with the said central hole 4. The housing 7 also serves as a lead-in electrode for the second electrode 2. That is the external connection to the second electrode 2 can be effected through the housing 7. The metallic housing 7 has disposed in the enlarged portion of the opening a body 8 of any suitable arc-resisting material complementary in configuration to the enlarged opening portion to form a relatively narrow gap between the entire surface of the arc-resisting block 8 and the entire wall surface of the enlarged opening portion. Then a piston 9 is slidably fitted into the reduced portion of the abovementioned opening within the metallic housing 7. The reduced portion provides a cylinder for the piston 9 and that space thereof disposed between the piston and the bottom is charged with any suitable pressurized gas 10. For sealing purpose, a plurality of O-rings 11 is disposed on the metallic housing 7 and the second electrode 2 as shown in FIG. 1.

A stop valve 12 is shown in FIG. 1 as being disposed in the hole 4 portion extending through the first electrode 1 and near the open end thereof. With the stop valve 12 put in its open position, an amount of any suitable current limiting material 15 is charged in the hole 4 and the stepped opening communicating therewith in the housing 7 from the open end of the hole and then stop valve 12 is closed to complete the current limiting device. Thus the current limiting material 15 is sealed in the hole 4 and the stepped opening as above described between the stop valve 12 and piston 9.

The current limiting material is in liquid or solid state and electrically conductive at room temperature. However, when heated, it vaporizes to become electrically non-conductive. When the vaporized material is cooled it is restored to its original liquid or solid state as the case may be to become conductive. As described in the cited applications, suitable examples of the current limiting material involve sodium (Na) potassic sodium (NaK), potassium (K), gallium (Ga), iron-cobalt alloys, silver (Ag) etc. Upon practicing the invention there is preferable the use of a current limiting material normally put in liquid state.

The arc resisting block 8 may be formed of an alloy selected from the group consisting of sintered alloys of silver and tungsten (Ag and W), copper and tungsten (Cu and W), silver and tungsten carbide (Ag and WC), copper and tungsten carbide (Cu and WC), tungsten (W), containing a small amount of thorium (Th) tungsten, nickel and cobalt (W, Ni and Co) etc. Also it may be of any one of tungsten carbide (WC), tungsten (W), Molybdenum (Mo), alumina, "Lucalox" (trade mark) consisting of polycrystalline alumina, beryllia etc.

In operation, a flow of overcurrent through the first electrode 1, the current limiting material 15 and the second electrode 2 causes the material to vaporize to electrically insulate the first electrode 1 from the second electrode 2. After both the electrodes have been insulated from each other for a predetermined interval of time the vaporized material is liquefied or solidified, as the case may be to electrically connect again the first electrode 1 to the second electrode 2.

The vaporization of the current limiting material is also causes the generation of a very high pressure in both the hole 4 and the stepped opening communicating thereto in the housing 7. The piston 9 cooperates with the pressurized gas 10 within its cylinder to provide buffer means for accommodating that very high pressure.

Also the vaporization of the current limiting material 15 occurs in the hole 4 extending through the first electrode 1, the insulating body 3 and the second electrode 2 and causes striking of an electric arc resulting in the formation of a plasmatic jet spouting toward the piston 9. In order to prevent the piston from fusing and damage due to that plasmatic jet spouting against the piston, the arc resisting block 8 has been provided upstream of the piston.

Also, in order to prevent the vaporized limiting material from externally leaking through a clearance which may be formed between the second electrode 2 and the housing or the lead-in electrode 7, the O-rings 11 have been operatively coupled to both electrodes.

FIG. 2 shows an arrangement substantially identical to that illustrated in FIG. 1 except for a metallic gasket 13 being sandwiched between the second and lead-in electrodes 2 and 7 respectively. The gasket 13 serves to prevent the current limiting material 15 as vaporized from externally leaking through between both the electrodes 2 and 7. Therefore in the arrangement of FIG. 2 the second and lead-in electrodes 2 and 7 respectively have not been provided with the O-rings 11 as shown in FIG. 1.

In an arrangement illustrated in FIG. 3, the second electrode 2 is jointed to the lead-in electrode 7 through line or surface contact A thereby to prevent any leakage of the vaporized limiting material. To put both the electrodes 2 and 7 in line or surface contact under pressure, one of the electrodes may be in the form of a convex surface while the other electrode is formed into a truncated cone or a knifeedge shape. In other espects, the arrangement is substantially identical to that shown in FIG. 2.

In an arrangement illustrated in FIG. 4, the metallic envelope 5 and the housing or lead-in electrode 7 are of a single piece structure. The metallic envelope 5 is first expanded with heat and then the first electrode 1, the insulating solid body 3 and the second electrode 2 integral with each other are forcedly fitted into the expanded envelope 5. Thereafter the envelope 5 is allowed to be cooled whereby the shrink fit is accomplished. This ensures that the vaporized limiting material is prevented from escaping from the space originally occupied by the same. That is a contacting surface labelled the reference character "A" between the second and lead-in electrodes 2 and 7 is effective for preventing any leakage of the vaporized limiting material.

If desired, the lead-in electrode 7 may be prepared separately from the metallic envelope 5 and then hermetically jointed to the latter through shrink fit. Also the contacting portion A may be hermetically sealed through the use of the measure as above described in conjunction with FIG. 3.

An arrangement shown in FIG. 5 comprises the second electrode 2 in the form of a hollow cylinder open at both ends and the lead-in electrode or housing 7 open at one end. Then the open end of the lead-in electrode 7 is closed by a cover plate 14 screw threaded into that end. Specifically, after the pressurized gas 10 has been introduced into the cylinder formed within the housing 7 including therein the arc resisting block 8, through its open end the cover plate 14 is screw threaded into the open cylinder end. Then the housing is fitted into the metallic envelopes 5 as in the direction of the arrow in FIG. 5 until it is strongly pushed against the insulating solid body 3 through the inerface B thereof in order to prevent any leakage of the vaporized limiting material. In this case the shrink fit may be used. Alternatively after having been fitted into the envelope 5 the housing may be welded to the envelope.

In all the arrangements illustrated in FIG. 1 through 5, the stop valve 12 can be closed on that side remote from the arc resisting block 8 through welding or brazing technique. After the current limiting material has been charged in the hole and stepped opening.

From the foregoing it will be appreciated that the invention has provided the improved current limiting devices in which a current limiting material is effectively prevented from leaking upon its vaporization by means of O-rings, a metallic gasket, metal-to-metal or metal-to-insulation contact under pressure or shrink fit.

While the invention has been illustrated and described in conjunction with several preferred embodiments thereof it is to be understood that various charges, modifications and substitutions may be resorted to without departing from the spirit and scope of the invention. For example, the portion A shown in FIG. 3 and 4 may be maintained hermetically sealed through welding or brazing rather than shrink fit.

What we claim is:

1. A current limiting device comprising, in combination, a first electrode and a second electrode disposed in spaced opposite relationship and having respectively a pair of central holes extending in axially aligned relationship therethrough, a solid body of electrically insulating material for electrically insulating said first electrode from said second electrode and having a hole extending therethrough and aligned and communicating with said central holes in said first and second electrode, a housing rigidly secured to said second electrode to form a hermetically sealed space with the latter, said hermetically sealed space communicating with all said holes, an amount of current limiting material filling both said holes and said hermetically sealed space and responsive to a flow of overcurrent therethrough to vaporize, and means for preventing said current limiting material upon its vaporization from leaking any clearance formed between said second electrode and said housing.

2. A current limiting device as claimed in claim 1 wherein said leakage preventing means include a plurality of O-rings operatively coupled to both said second electrode and said housing.

3. A current limiting device as claimed in claim 1 wherein said leakage preventing means include a metalic gasket sandwiched between said second electrode and said housing.

4. A current limiting device as claimed in claim 1 wherein said leakage preventing means are provided by the contact between said second electrode and said housing under pressure.

5. A current limiting device as claimed in claim 1 wherein said leakage preventing means are provided by the welding of said housing with said second electrode.

6. A current limiting device as claimed in claim 1 wherein said leakage preventing means are provided by the brazing of said housing to said second electrode.

7. A current limiting device as claimed in claim 1 wherein said leakage preventing means are provided by mounting of said housing to said second electrode through shrink fit.

8. A current limiting device as claimed in claim 1 further comprising an envelope having said housing and said second electrode accommodated therein through shrink fit which provides said leakage preventing means.

9. A current limiting device as claimed in claim 1 wherein said leakage preventing means are provided by contact between said housing and said insulating solid body under pressure.

* * * * *